Aug. 31, 1948.        B. CARLIN        2,448,352
PIEZOELECTRIC CRYSTAL MOUNTING MEANS
Filed March 26, 1946

INVENTOR.
BENSON CARLIN
BY
Joseph H. Lipschutz
ATTORNEY

Patented Aug. 31, 1948

2,448,352

UNITED STATES PATENT OFFICE 2,448,352

PIEZOELECTRIC CRYSTAL MOUNTING MEANS

Benson Carlin, New York, N. Y., assignor to Sperry Products, Inc., Hoboken, N. J., a corporation of New York Application March 26, 1946, Serial No. 657,306

6 Claims. (Cl. 171—327)

This invention relates to piezo-electric crystal mounting means, particularly for use in supersonic inspection of materials wherein supersonic waves are generated by subjecting the crystal to electric oscillations, and wherein variations in said waves are determined by receiving said waves either by the same crystal or by another crystal and determining the variations in amounts received. The proper control of the quantity, form and direction of supersonic waves used for this purpose are of the utmost importance since small variations are dealt with in the inspection of materials and slight deviations from predetermined operating conditions may result in variations greater than those which it is sought to detect.

Among the problems of proper control of supersonic waves utilized for the above described purposes may be mentioned: (1) The reflections from a crystal holder which return to the rear face of the crystal and, depending upon the phase of the returning waves, may vary the supersonic beam which is transmitted. Efforts heretofore made to overcome this problem have taken the form of damping means interposed between the holder and the rear face of the crystal, but such means resulted in cutting down the power appreciably. (2) Another problem consists in limiting the cross-sectional area of the supersonic beam to the desired dimensions while utilizing a crystal whose front or transmitting face is of considerably greater area than the cross-sectional area of the beam in order that sufficient power may be developed.

It is one of the principal objects of this invention therefore to provide means for solving either one or both of the above problems.

Further objects and advantages of this invention will become apparent in the following detailed description thereof.

In the accompanying drawings.

Figure 1:
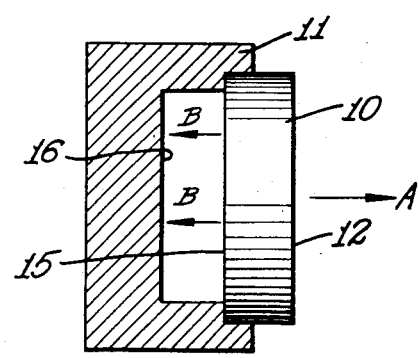
Fig. 1 is a section through a crystal mounting means embodying one form of this invention.

Referring to Fig. 1 of the drawings, there is shown a crystal 10 supported in a holder 11 at the outer edges of the crystal. The crystal is vibrated electrically from any suitable source of electrical oscillation, not shown, to cause the front face 12 of the crystal to propagate supersonic waves in the direction of the arrow A. Since the crystal vibrates as a whole, its rear face 15 will also vibrate and transmit waves toward the holder 11, as indicated by the arrows B. These waves would ordinarily be reflected back from the holder and if the reflected waves returning to the crystal surface 15 of the crystal were out of phase with the vibrations of the crystal it would result in appreciably cutting down the power transmitted by the crystal. Heretofore, efforts have been made to reduce the effect of the rear reflections by introducing damping means between the holder 11 and the rear face 15 of the crystal, but this resulted also in cutting down the power of the crystal, sometimes by as much as one-half.

The solution which I propose for this problem consists in spacing the rear wall 16 of the holder 11 from the rear wall 15 of crystal 12 and forming the rear wall and, if desired, the entire holder 11 of vibration absorptive material. Thus the full power of the crystal may be utilized without the disadvantage of interfering reflections returning to the crystal and without cutting down the crystal power, as in damping.

Figure 2:
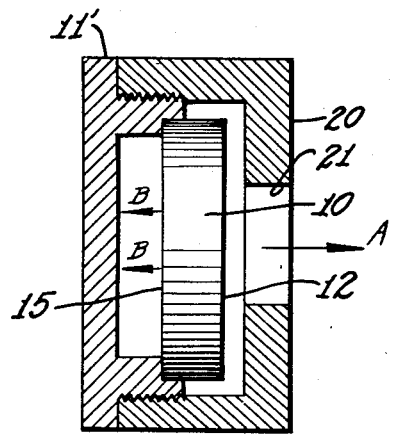
Fig. 2 is a view similar to Fig. 1 showing a modified form of crystal mounting means.

In addition to cutting down reflections from the holder to the rear surface of the crystal there are other sound waves which it may be desired to eliminate. Thus, for example, in order to obtain large power, a crystal of large front face area is employed, but in the supersonic inspection of materials, particularly for small defects, it is desirable to have a concentrated sound beam. Therefore, I may utilize the same principle as in holder 11 by providing a holder 11' (see Fig. 2) of vibration absorptive material which not only absorbs the reflections from the rear surface 15 of the crystal, but will absorb all vibrations transmitted from the front face except for any desired small cross-sectional area of the beam. For this purpose the holder 11' may be provided with a front wall 20 having an aperture 21 therein of the desired cross-sectional area of the beam. The front wall 20 of the holder being also of vibration absorptive material will cut off, through absorption, the transmission of all supersonic waves except those passing uninterruptedly through aperture 21. In this manner a beam of any desired small cross-sectional area may be obtained from a crystal of relatively large area and high power.

Figure 3:
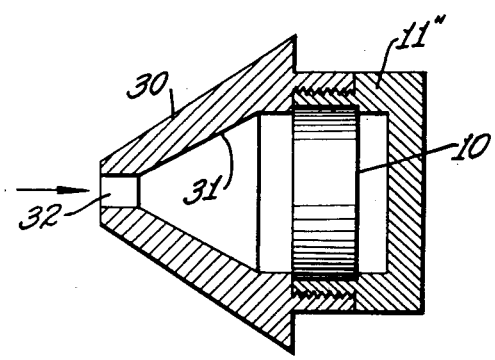
Fig. 3 is a view similar to Fig. 2 showing a modified form of means for limiting the transmitted sound beam.

In Fig. 3 there is shown another method for obtaining a supersonic beam of limited cross-sectional area. In this form there may be provided a shield 30 of vibration absorptive material and having an interior cone shaped opening 31.

This opening at its large end cooperates with a substantial area of the crystal 10, but at its front end is provided with a narrow opening 32 of the cross-sectional area of the desired beam. The shield 30 may be threaded upon or otherwise connected to the holder 11", or it may be maintained separate therefrom.

Figure 4:
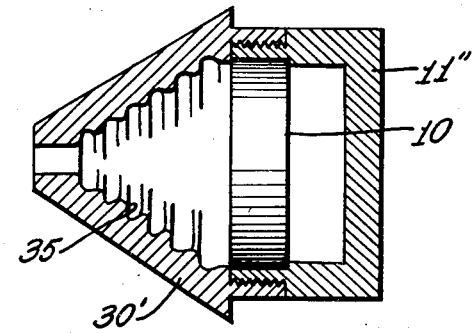
Fig. 4 is a view similar to Fig. 3 showing a modified form of the Fig. 3 device.

In Fig. 4 there is illustrated a slight modification of the type of shield 30 shown in Fig. 3. In this form the shield 30' is provided with an irregular interior surface 35 which may be corrugated or otherwise roughened to provide a sufficient number of reflecting surfaces so that in the event that the vibration absorbing material is not 100% absorbing, and some reflections of vibrations nevertheless occur, these reflections will be dispersed by the multiplicity of reflecting faces on the surface 35.

The foregoing description of the invention is merely illustrative and changes may be made within the scope of the appended claims.

Having described my invention, what I claim and desire to secure by Letters Patent is:

1. In combination, a piezo-electric crystal having a front face and a rear face and adapted to be vibrated, and means for cutting off the transmission of vibrations from predetermined areas of the front face, said means comprising vibration absorptive material in the path of vibrations from the predetermined areas.

2. In combination, a piezo-electric crystal having a front face and a rear face and adapted to be vibrated, and means for cutting off the transmission of vibrations from predetermined areas of the front face, said means comprising a cap of vibration absorptive material in the path of vibrations from the predetermined areas, said cap having an opening therethrough to permit passage of the vibrations from the other areas.

3. In combination, a piezo-electric crystal having a front face and a rear face and adapted to be vibrated, and means for cutting off the transmission of vibrations from predetermined areas of the front face, said means comprising a cap of vibration absorptive material in the path of vibrations from the predetermined areas, the inner surface of said material being formed with a multiplicity of reflecting surfaces to diffuse any vibrations not absorbed, said cap having an opening therethrough to permit passage of the vibrations from the other areas.

4. In combination, a piezo-electric crystal having a front face and a rear face and adapted to be vibrated, and means for limiting the cross-sectional area of the sound beam transmitted by the front face, said means comprising a shield of vibration absorptive material cooperating with the front face, the shield having an opening therethrough of the desired cross-sectional area of the beam to be transmitted.

5. In combination, a piezo-electric crystal having a front face and a rear face and adapted to be vibrated, and a holder of vibration absorptive material for said crystal, said holder having a portion cooperating with the rear face to prevent reflections from the holder to the rear face, said holder having portions cooperating with predetermined areas of the front face to absorb transmission of vibrations from said areas while permitting uninterrupted transmission of vibrations from the remaining areas of the front face.

6. In combination, a piezo-electric crystal having a front face and a rear face and adapted to be vibrated, a holder of vibration absorptive material for said crystal, said holder having a portion cooperating with the rear face to prevent reflections from the holder to the rear face, and a shield of vibration absorptive material cooperating with the front face, the shield having an opening therethrough of desired cross-sectional area to permit uninterrupted transmission of a beam having said area.

BENSON CARLIN.

REFERENCES CITED

The following references are of record in the file of this patent:

UNITED STATES PATENTS

| Number | Name | Date |
| --- | --- | --- |
| 2,415,832 | Mason | Feb. 18, 1947 |

Disclaimer 2,448,352.—*Benson Carlin*, New York, N. Y. PIEZOELECTRIC CRYSTAL MOUNTING MEANS. Patent dated Aug. 31, 1948. Disclaimer filed Aug. 30, 1949, by the assignee, *Sperry Products, Inc.*

Hereby enters the following disclaimer:

From the scope of claim 1, all means for cutting off the transmission of vibrations from predetermined areas of the front face of the piezoelectric crystal in which such means are not spaced from the front face of the piezoelectric crystal.

[*Official Gazette October 18, 1949.*]